3,459,729
Patented Aug. 5, 1969

3,459,729
MONOAZO TRIAZINE CONTAINING DYESTUFFS
Argento Crotti, Cogliate, and Fabrizio Merlo, Turin, Italy, assignors to Aziende Colori Nazionali Affini ACNA S.p.A., Milan, Italy, a corporation of Italy
No Drawing. Continuation-in-part of application Ser. No. 337,544, Jan. 14, 1964. This application Apr. 24, 1967, Ser. No. 635,640
Int. Cl. C09b 29/38, 62/08
U.S. Cl. 260—153    10 Claims

ABSTRACT OF THE DISCLOSURE

Plastosoluble dyestuffs suitable for dyeing polyolefin material having the formula:

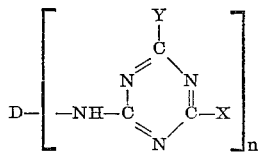

wherein D is a residue of a water insoluble monoazo or non-vattable anthraquinone dyestuff, which dyestuff residue is free from both sulfo and carboxy groups and may have one or more halogen, amino, hydroxy, $NO_2$, alkyl or alkoxy substituents having up to about 6 carbon atoms thereon; the —NH— bridge is directly bonded to a carbon of an aryl ring of the dyestuff residue, D; $n$ is 1 or 2; and X and Y are each selected from the group consisting of alkylamino, dialkylamino, alkylmercapto and alkoxy radicals having from about 3 to 18 carbon atoms.

CROSS-REFERENCE TO RELATED APPLICATION

This application is a continuation-in-part of copending application Ser. No. 337,544, filed Jan. 14, 1964, now abandoned.

BACKGROUND OF THE INVENTION

Field of the invention

This invention relates to a new class of plastosoluble dyestuffs suitable for the dyeing of polyolefin material, and in particular for the dyeing of polypropylene fibers.

Description of the prior art

The use of cyanuric chloride as an intermediate for the preparation of reactive dyestuffs characterized by structures of the following type:

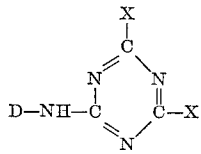

wherein D is the residue of a dyestuff provided with hydrosolubilizing groups, at least one X is Cl, and the other X may be Cl or (a) a residue of another hydrosoluble dyestuff the same as or different from D; or (b) an arylamine, more or less substituted, which may or may not have hydrosolubilizing groups, is known.

Dyestuff structures free of hydrosolubilizing groups are used in the dispersed state. These dyestuffs have as a main characteristic the presence of at least one reactive chlorine in the cyanuric radical and are used for the dyeing of cotton, wool, and nylon. Dyestuffs capable of dyeing polyolefin material, in particular polypropylene, characterized by the presence of alkyl groups having 3 or more carbon atoms, to more or less intense shades, are also known.

SUMMARY OF THE INVENTION

We have now found a new class of plastosoluble dyestuffs particularly suitable for the dyeing of polyolefin material, these dyestuffs having the formula:

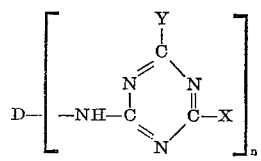

wherein D is a residue of a water insoluble monoazo or non-vattable anthraquinone dyestuff, which dyestuff residue is free from both sulfo and carboxy groups and may have one or more halogen, amino, hydroxy, $NO_2$, alkyl or alkoxy substituents having up to about 6 carbon atoms thereon; the —NH— bridge is directly bonded to a carbon of an aryl ring of the dyestuff residue, D; $n$ is 1 or 2; and X and Y are each selected from the group consisting of alkylamino, dialkylamino, alkylmercapto and alkoxy radicals having from about 3 to 18 carbon atoms.

DESCRIPTION OF THE PREFERRED EMBODIMENTS

The plastosoluble dyestuffs of the present invention are characterized by a high affinity towards polypropylene, which they dye in shades having good fastness, and in particular very good fastness to both light and sublimation conditions.

One method of preparing the dyestuffs of this invention comprises reacting, in a suitable suspension or solution, one mol of cyanuric chloride with one mol of a suitable alkylamine (or alkylmercaptan or alcohol). Then, the thus obtained product is condensed with one mol of the selected dyestuff, in the same or different reaction medium, and then the condensation product is reacted with an excess of an alkyl derivative which may be the same as or different from that used in the first reaction but is always an alkylamine, dialkylamine, alkylmercaptan, or alkyl alcohol.

The preferred suspending medium consists of dioxane and water, and may or may not include an additive obtained by reacting one mol of oleic alcohol with 18 mols of ethylene oxide.

A variation to this method comprises first carrying out the condensation between one mol of cyanuric chloride and one or two mols of one or more dyestuffs, and then condensing the thus obtained product with an excess of alkyl derivative, either amine, mercaptan or alcohol.

Another method for the preparation of the dyestuffs of the invention, which method has the advantage that the condensation of the cyanuric chloride with the alkyl derivatives may be carried out in aqueous suspension only, without organic solvents, and also provides for a simpler preparation of the dyestuffs, involves the reaction of one mol of cyanuric chloride with two mols of an alkyl derivative, i.e., an alkyl amine, mercaptan or alcohol, in aqueous suspension, in the presence of a dispersing agent. The dispersing agent is preferably the reaction product between one mol of oleic alcohol and 18 mols of ethylene oxide. The temperature is maintained between about 0 and 30° C. until the reaction is completed. The reaction time is generally about 30 minutes. The suspension is then mixed with an alkaline substance in order to neutralize the HCl formed, and at the same time the suspension is heated to 50–60° C.

By working as described, an intermediate is obtained having the general formula:

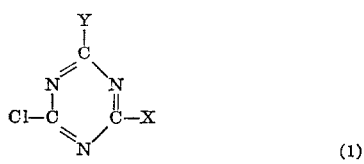

(1)

wherein X and Y are as defined above.

The thus obtained intermediate product is condensed with a dyestuff, in a molar ratio of 1:1, in the presence of a high boiling organic solvent, at a temperature between about 150 and 220° C. Preferred solvents are: o-dichlorobenzene, alpha-chloronaphthalene, and trichlorobenzene.

In a variation of this method, which may be employed to prepare dyestuffs having the following structure:

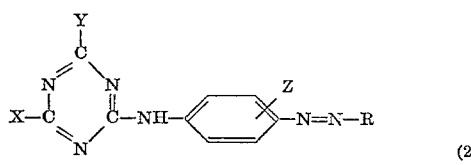

(2)

wherein X and Y are as defined above, Z is a hydrogen or methyl radical, and R is any coupling residue which is free from hydrosolubilizing groups, for example,

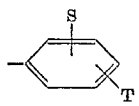

wherein S is hydrogen or hydroxyl and T is hydrogen, lower alkyl or cyclohexyl;

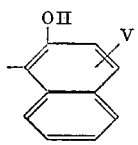

wherein V is hydrogen or

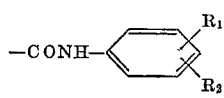

wherein $R_1$ is —OCH$_3$ or —Cl and $R_2$ is —OCH$_3$ or hydrogen; or

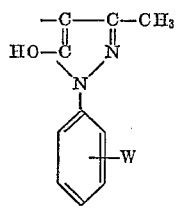

wherein W is hydrogen, —Cl or a lower alkyl radical having from 1 to 6 carbon atoms, phenol, an alkyl phenol, beta-naphthol, phenylmethylpyrazolone, a derivative of beta-hydroxy-naphthoic acid or an N-alkyl- or N-dialkyl-aniline, wherein the alkyl radical contains from about 1 to 6 carbon atoms, the intermediate (1) is condensed with p-aminoacetanilide at about 100° C. in an organic solvent, which is preferably dioxane.

The thus obtained product is hydrolyzed with HCl at the boiling temperature. The diazotization and the coupling (with RH) are carried out according to methods known in the art. In particular, the diazotization is preferably carried out with NaNO$_2$ in aqueous medium, whereas the coupling may be carried out either in an aqueous medium or in an organic solvent, such as dimethylformamide or alcohol.

The dyestuffs of this invention are used advantageously for dyeing polyolefin material, and in particular polypropylene. A wide range of shades is obtained, depending upon the dyestuff or the dyestuffs employed, all of which are characterized by very good general fastness.

As compared to the starting dyestuffs, D, the dyestuffs of the present invention have the advantages of either (a) greatly increased affinity towards polypropylene, with shades showing very good fastness to light and sublimation conditions; or (b) an outstanding improvement of fastness in the case of dyestuffs which originally had a certain affinity towards polypropylene.

The dyestuffs of the present invention may be applied to synthetic material, in particular polypropylene material, by directly contacting the material with an aqueous dispersion of the dyestuffs, at a temperature of about 95–100° C., under atmospheric pressure, for 30–90 minutes. Then the material is soaped, at a temperature of from about 60 to 80° C., for 30 minutes, with a soap solution containing from 1 to 5 g./l. of soap or with a 1% solution of a detergent of the Dispersol E type.

If necessary, the dyed material may undergo a mild treatment at 50–60° C. with a dilute alkaline solution of hydrosulfite in order to remove the dyestuff which did not penetrate and which remains on the surface. This may occur, particularly, in the case of concentrated dyeings. The material dyed on these dyestuffs, however, does not show any cold migration (transudation).

A variation of the above described dyeing process involves dyeing of the synthetic material in aqueous dispersion, but under increased pressure, at temperatures between about 100° and 125° C., preferably between about 110° and 120° C., for a period of 30–60 minutes. This variation affords an increase in the intensity of the dyeing without adversely affecting the fastness or mechanical characteristics of the dyed material.

Another variation on the above mentioned dyeing process involves the application of the dyestuffs by padding in the presence of suitable additives, followed by development at 120° C. for a few minutes.

The following examples are presented to further illustrate the invention and are not intended to limit the scope thereof.

Example 1

An aqueous suspension containing 0.1 mol of cyanuric chloride (about 18.4 g.) was obtained by pouring thereon a solution of 60.0 g. of dioxane in 40 ml. of H$_2$O in the presence of a dispersing agent, (for instance Dispersol E, that is the condensation product of 1 mol of oleic alcohol with 18 mols of ethylene oxide) at 0–2° C. Then 0.1 mol of butylamine (7.3 g.) was added under vigorous agitation. The hydrochloric acid evolved during the reaction was neutralized with Na$_2$CO$_3$.

The product was filtered, washed with H$_2$O, and dried in air.

A product was obtained with a yield of about 90% and which had a melting point of 50–51° C. (see: Journal of Am. Chem. Soc. 73, 2981 (1951)).

An aqueous suspension, consisting of 0.1 mol (22.1 g.) of the above obtained product was obtained by dissolving the above product in 60 g. of dioxane and pouring this solution into 40 ml. of $H_2O$ in the presence of a dispersing agent (e.g. Dispersol E), under vigorous agitation. This dispersion was added to a solution consisting of 0.1 mol (19.7 g.) of p-aminoazobenzene in dioxane (about 400 ml. of dioxane for 1 mol of cyanuric chloride). The reaction mixture was then heated at 90° C. until the reaction was completed. The hydrochloric acid which evolved was neutralized with $Na_2CO_3$.

The product was filtered, washed with hot water, and crystallized with dioxane. The product was a yellow-brown powder.

A dioxane solution of 0.1 mol (38.2 g.) of the thus obtained product was heated under reflux with an excess of butylamine (0.5 mol; 36.6 g.) and the evolved HCl was neutralized with $Na_2CO_3$. After 1–2 hours the reaction was completed, the solution was clarified by filtration, washed with water and filtered. The product was then dissolved in $H_2SO_4$, and precipitated with water. The product, a yellow-brown powder, dyed polypropylene to a yellow-brown shade which was particularly fast to light and sublimation conditions. It had the following structural formula:

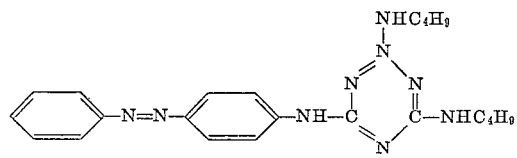

Example 2

The monobutylamino derivative of cyanuric chloride (M.P. 50–51° C.) of the preceding example was reacted with 1 - amino-2,2′-dimethyl-4,1′-azobenzene under the conditions described in Example 1.

A yellow-brown powdery product was obtained which dyed polypropylene in a banana-yellow shape having good fastness.

This product, when further condensed with butylamine, under the conditions described in Example 1, gave a yellow-brown powdery dyestuff which dyed polypropylene to a banana-yellow shade which was very fast to light and sublimation conditions. It had the following structural formula:

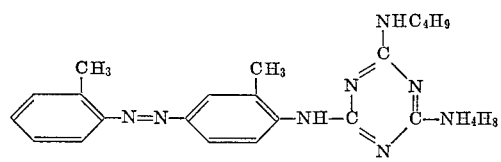

Example 3

An aqueous suspension of 0.1 mol (18.4 g.) of cyanuric chloride obtained according to directions in Example 1 was reacted with dioxane solution of 0.1 mol (19.7 g.) of p-amino-azobenzene at 0–2° C. The evolved HCl was neutralized with $Na_2CO_3$. Then the solution was filtered and the product washed.

A dioxane solution of 0.1 mol of the thus obtained di-chlorinated product was reacted, at the boiling temperature, with an excess of butylamine (0.8 mol) until the reaction was completed. The evolved HCl was neutralized with $Na_2CO_3$.

The thus obtained diaminobutyl derivative, after it was clarified, immersed in water, filtered and purified, showed characteristics and behavior comparable with those of the corresponding product of Example 1.

Example 4

The reaction was carried out as described in Example 3, except that 1-amino-2,2′-dimethyl-4,1′-azobenzene was used instead of p-amino-azobenzene.

The product obtained had characteristics similar to those of the diaminobutyl derivative product of Example 2.

Example 5

An aqueous suspension of 0.1 mol (18.4 g.) of cyanuric chloride, obtained according to the procedure described in Example 1, was reacted at 0–2° C. with a dioxane solution of 0.1 mol (19.7 g.) of para-amino-azobenzene.

The HCl which evolved was neutralized with $Na_2CO_3$, and reaction mixture was then filtered and washed.

A dioxane solution of 0.1 mol of the product obtained above was reacted with 0.8 mol of butylmercaptan (72 g.), under reflux conditions, until the reaction was completed. The evolved HCl was neutralized with $Na_2CO_3$. The product, after filtration and purification, dyed polypropylene to a banana-yellow shade having very good fastness to light and sublimation conditions. It had the following structural formula:

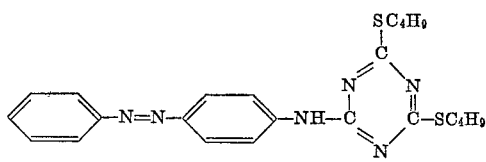

Example 6

A solution of 0.1 mol of the di-chlorinated product of Example 5 in about 50 ml. of dioxane was reacted with 0.1 mol of butylmercaptan at 40–45° C. The HCl which evolved was neutralized with $Na_2CO_3$. After the completion of the reaction, 0.1 mol of butylamine were added and the reaction mixture was heated under reflux conditions until the reaction was completed. The evolved HCl was neutralized with $NaCO_3$.

The thus obtained product, having the two residual halogens of the triazine nucleus substituted, respectively, by an aminobutyl radical and by a thiobutyl radical, dyed polypropylene with a banana-yellow shade having high fastness to light and sublimation conditions. It had the following structural formula:

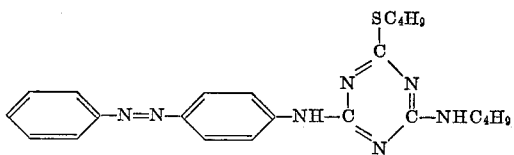

Example 7

2 g. of the dyestuff of Example 1 were dissolved in 3 ml. of acetone, dispersed in 2 liters of water and the dispersion then heated to boiling. 100 g. of polypropylene fabric were introduced into each 2 liter boiling dispersion. Each of the boiling dispersions containing the fabric was kept at 90–95° C. for 30 minutes. The dyed fabric was removed and treated for a half hour at 80° C. with 2 liters of a soap solution having a concentration of 5 g./l. A dyeing of a dark yellow shade was obtained which had good general fastness properties and a very remarkable fastness to sublimation.

Example 8

Working in an autoclave, 100 g. samples of polypropylene fabric were introduced into each of the dispersions prepared as described in Example 7. The temperature was raised to 110–120° C., for 30 minutes, while keeping the vessel closed. The dyed fabric was removed and treated as in Example 7.

A dyeing was obtained of a yellow shade slightly darker than that of the preceding example, the fastness properties being similar.

Example 9

55.8 g. of cyanuric chloride were added to 600 g. of H₂O containing 5 g. of an additive obtained by reacting one mol of oleic alcohol with 18 mols of ethylene oxide and then cooled to 0° C., while under agitation. 47 g. of butylamine were then added to the thus obtained suspension over a period of about 20 minutes (molar ratio of cyanuric chloride to butylamine of about 1/2) and the temperature was allowed to rise during the addition to 25–30° C. Finally 60 ml. of 30% NaOH were added over a period of 40–50 minutes, and, contemporaneously, the reaction mixture was heated to a temperature of 58–60° C., this temperature being reached at about the end of the NaOH addition.

The agitation was continued at a temperature of 50–60° C. for 15–20 minutes, and then the reaction mixture was cooled and filtered, washed until chlorine was no longer present, and then dried in an oven at 100° C. Dibutylaminomonochlorotriazine was obtained with a yield and characteristics corresponding to the theoretical values (M.P. 212° C.).

5.14 g. of this product were reacted with 4.8 g. of alpha-amino-anthraquinone (molar ratio 1:1) in 100 ml. of o-dichlorobenzene at 180° C. for 5–6 hours. The mass was then cooled and filtered.

The product was crystallized from amyl alcohol in the form of a yellow powder which gave yellow shades having very good general fastness to polypropylene. It had the following structural formula:

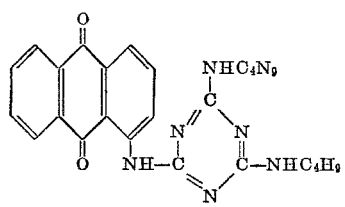

Examples 10–13

By following the procedure described in Example 9, using the reagents and conditions reported in Table I, wherein the term "intermediate" means dibutylamino-monochlorotriazine, the dyestuffs of Examples 10–13 were obtained. They dyed polypropylene the shades indicated in the last column of Table I, and the dyed products exhibited good fastness characteristics. In the formulas of these dyestuffs listed below Table I, Z is the following radical:

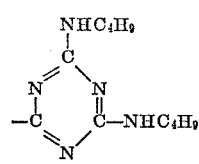

(10) 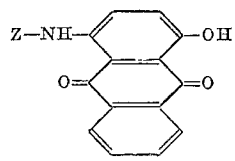

(11) 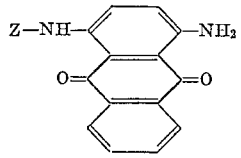

(12) 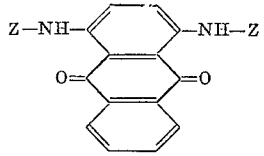

(13) 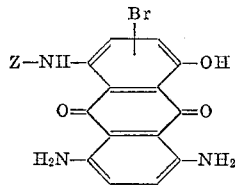

Examples 14–18

5.14 g. of 2,4-di-butylamino-6-monochlorotriazine, obtained according to the procedure of Example 9, were reacted with 3.2 g. of p-aminoacetanilide (molar ratio 1:1) in the presence of 1.06 g. of Na₂CO₃ in 80 ml. of dioxane while maintaining the temperature at 101–102° C. for 4–5 hours, under agitation. The reaction mixture was then cooled to 75° C. and discharged into 1500 ml. water while under agitation. The white precipitate was filtered and washed until chlorine ions were no longer present. The ionic chlorine content corresponded to about the theoretical value. The product, in the form of a paste, was treated with a solution of 50 ml. of water added to 15–20 ml. of 30% HCl for 3 hours at 98–99° C. The solution was then cooled at room temperature (18–25° C.), the precipitate filtered with suction and crystallized from a solution containing water and 21° Bé. HCl in a ratio 1:2. The precipitate was further filtered and the obtained dichlorohydrate dried. It had a melting point of about 160° C. 4 g. of this chlorohydrate were dissolved in 100 ml. of hot water (60°–70° C.) and 20 ml. of concentrated HCl (30%). The mixture was then boiled until complete solution was obtained (about 10 minutes) and then the solution was cooled to 0–5° C. The chlorohydrate precipitated in the form of very fine granules and was diazotized quickly with 50 ml. of 0.2 N NaNO₂. The diazo was in solution and was purified by filtration to remove traces of impurities. The solution was used, as such, for coupling with the coupling agent under the conditions set forth in Table II. The resulting dyestuffs dyed poly-

TABLE I

| Ex. | Molar ratio intermediate/dye | Base dye | Reaction temp., degrees | Reaction solvent | Crystalliz. solvent | Color of powder | Dyeing shade |
|---|---|---|---|---|---|---|---|
| 10 | 1:1 | 1-amino-4-hydroxyanthraquinone | 180 | o-Dichlorobenzene | C₅H₁₁OH | Dark red | Pink. |
| 11 | 1:1 | 1,4-diaminoanthraquinone | 180 | ....do.... | o-Dichlorobenzene | Dark violet | Violet. |
| 12 | 2:1 | ....do.... | 180 | ....do.... | ....do.... | ....do.... | Do. |
| 13 | 1:1 | Monobromodiaminoanthrarufine | 180 | ....do.... | ....do.... | Dark blue | Blue. | propylene, with good fastness, the shades obtained being indicated in the last column of Table II.

Example 19

An acetone solution of the dyestuff of Example 18 was

TABLE II

| Ex. | Coupling agent | Molar ratio coupling agent diazo | Solvent for coupling agent | Buffering agent | pH | Crystallization solvent | M.P. of the product, °C. | Color of the product (powder) | Dyeing shade |
|---|---|---|---|---|---|---|---|---|---|
| 14 | Beta-naphthol | 1:1 | H₂O+NaOH | Na₂CO₃ | 8-9 | C₅H₁₁OH | 170 | Red | Orange. |
| 15 | N-phenyl-3-methyl-pyrazolene | 1:1 | H₂O+NaOH | Na₂CO₃ | 8-9 | C₅H₁₁OH | 200-205 | Yellow brown | Yellow. |
| 16 | Naphthol BG ¹ | 1:1 | Dimethylformamide | Na₂CO₃ | 8-9 | C₄H₉OH | 150-160 | Red-violet | Violet. |
| 17 | Naphthol PG ² | 1:1 | do | Na₂CO₃ | 8-9 | o-Dichlorobenzene | 160 | Dark red | Do. |
| 18 | p-Sec-butylphenol | 1:1 | Ethyl alcohol | Na₂CO₃ | 8-9 | H₂SO₄ | 105 | Yellow | Yellow. |

¹ See the following formula:

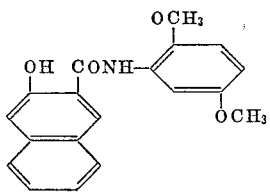

² See the following formula:

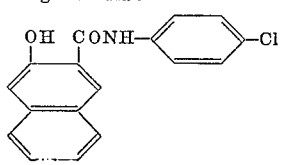

The dyestuffs of Examples 14–18 had the following structural formulas:

Example 14

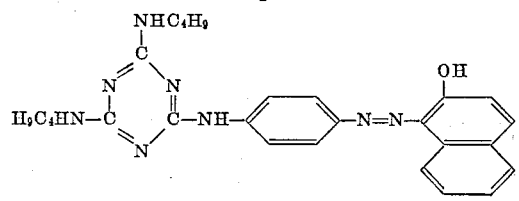

Example 15

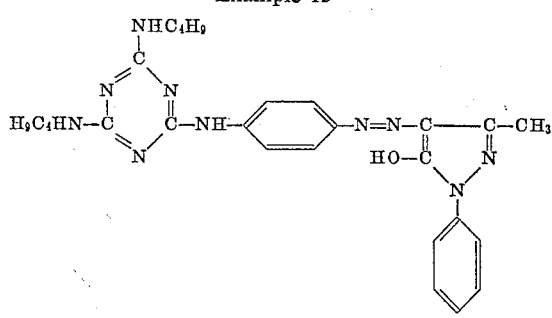

Example 16

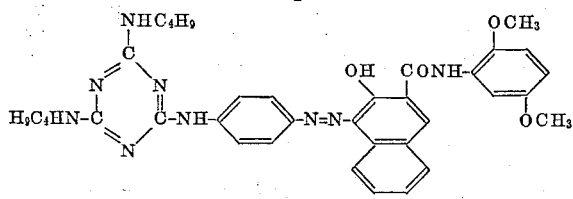

Example 17

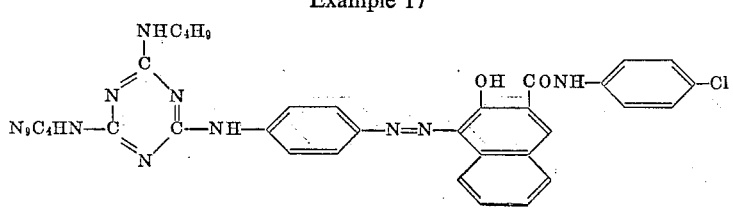

Example 18

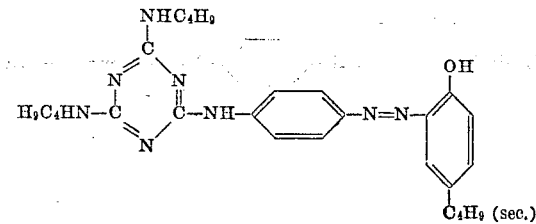

dispersed in water in the presence of dispersing agents (e.g. Dispersol E). Polypropylene fabric was introduced into each of the boiling dispersions while maintaining the temperature at 95–100° C. for 60 minutes.

The fiber/bath ratio was about 1:30 and the dyestuff was present in the bath in an amount corresponding to 2% on the weight of the fiber.

The dyed materials were then washed at 80° C. for half an hour with a 5 g./l. soap solution.

A uniform dyeing with a deep yellow shade was obtained, showing very good general fastness properties, particularly to sublimation.

Example 20

The dispersion prepared as described in Example 19 was introduced into an autoclave together with polypropylene fabrics. The temperature was maintained at 110–120° C. for one hour, and the dyed fabrics thereafter washed at 80° C. for half an hour with a 5 g./l. soap solution. A uniform dyeing was obtained having the same characteristics as that of the preceding example.

Example 21

55.8 g. of cyanuric chloride were added to 600 g. of H₂O containing 5 g. of an additive obtained by reacting one mol of oleic alcohol with 18 mols of ethylene oxide and then cooled to 0° C., while under agitation. 36 g. of diisopropylamine were then added to the thus obtained suspension over a period of about 20 minutes (molar ratio of cyanuric chloride to isopropylamine of about 1/2) and the temperature was allowed to rise during the addition to 25–30° C. Finally, 60 ml. of 30% NaOH were added over a period of 40–50 minutes and, contemporaneously, the reaction mixture was heated to a temperature of 58–60° C., this temperature being reached at about the end of the NaOH addition.

The agitation was continued at a temperature of 50–60° C. for 15–20 minutes, and the reaction mixture was cooled and filtered, washed until chlorine was no longer present, and then dried in an oven at 100° C. Diisopropylaminomonochlorotriazine was obtained with a yield and characteristics corresponding to the theoretical values (M.P. 215° C.).

4.7 g. of this product were reacted with 3.2 g. of p-amino-acetanilide (molar ratio 1:1) in the presence of 1.06 g. of Na₂Co₃ in 80 ml. of dioxane at a temperature of 101–102° C. for 4–5 hours, with agitation. The reaction mixture was then cooled to 75° C. and discharged with continuous agitation into 1500 ml. water. The white precipitate was filtered and washed until chlorine ions were no longer present. The ionic chlorine content corresponded to about the theoretical value.

The product, in the form of a paste, was treated with 50 ml. of water combined with 15–20 ml. of 30% HCl for 3 hours at 98–99° C. The solution was then cooled at room temperature (18–25° C.), the precipitate filtered with suction and crystallized from a solution containing water and 21 Bé. HCl in a ratio of 1:2. The precipitate was again filtered and the dichlorohydrate thus obtained was dried.

3.74 g. (0.01 mol) of the 2,4-diisopropylamino-6-p-aminoanilido-triazine dichlorohydrate were added to a mixture of 20 ml. of concentrated HCl and 50 ml. of H₂O, then cooled to 0° C. 11 ml. of a 1 N NaNO₂ solution were then added under agitation. After 15–20 minutes, sulfaminic acid was added to remove the excess of NaNO₂. The diazo was added over a period of 10 minutes to a solution containing 1.5 g. (0.01 mol) of p-sec-butyl-phenol in 8 ml. of 30% NaOH and 50 ml. of H₂O at 0–5° C. The pH of the solution was maintained at 8–9 by adding 7–8 g. of Na₂CO₃.

The solution was agitated at 0–5° C. for 1 hour and then 200 ml. of H₂O were added. Then the mixture was filtered and washed until neutral reaction.

A yellow powder was obtained in a high yield. It had the following structural formula:

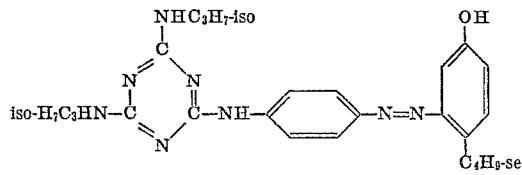

This powder dyed polypropylene in an intense, uniform, and very fast yellow shade.

Example 22

The diazo derivative of 2,4-diisopropylamino-6-p-aminoanilido-triazine, prepared according to the procedure described in Example 21, was added over 10 minutes to a solution of 1.8 g. (0.01 mol) of p-cyclohexylphenol in 100 ml. of ethyl alcohol and 7 ml. of 30% NaOH at 0–5° C. The pH of the solution was maintained at 8–9 by addition of Na₂CO₃ (7–8 g.). The solution was agitated at 0–5° C. for 1 hour and then 200 ml. of H₂O were added. The mixture was then filtered and washed until the washings were neutral.

A yellow-brown powder was obtained which dyed polypropylene fiber in an intense, uniform, and very fast yellow shade. It had the following structural formula:

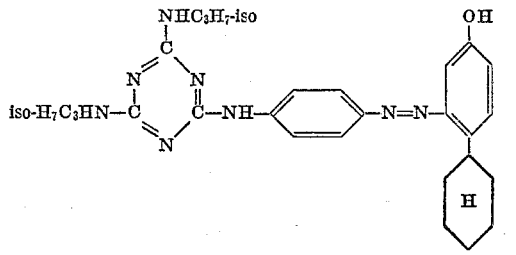

Example 23

3.15 g. (0.01 mol) of 2,4-di-butyl-amino-6-p-amino-anilino-triazine, prepared according to the procedure described in Examples 14–18, were treated with 20 ml. of concentrated HCl and 50 ml. of H₂O as in Examples 14–18. The solution was then cooled to about 0° C. and 11 ml. of 1 N NaNO₂ were added under agitation.

After 15–20 minutes, the excess HNO₂ was removed by sulfamic acid. A solution consisting of 2.2 g. (0.01 mol) of 1-N-(m-chloro)-phenyl-3-methyl-5-pyrazolone in 10 ml. of 10% Na₂CO₃+50 ml. of water at 0–5° C. was then added. The pH was maintained at about 9–8 by addition of suitable amounts of Na₂CO₃ and the reaction mixture was agitated for 1 hour. Then, it was diluted with 200 ml. of H₂O. By filtration and washing to neutral, a product in the form of a yellow-orange powder which dyed polypropylene fiber in a yellow shade having good general fastness was obtained. It had the following structural formula:

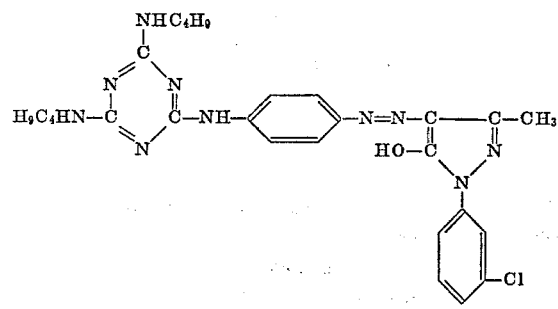

Example 24

By working as described in Example 23, but using an equivalent amount of 1-N(p-methyl)-phenyl-3-methyl-5-pyrazolone instead of 1-N(m-chloro)-phenyl-3-methyl-5-pyrazolone, a dyestuff showing analogous dyeing properties was obtained. It had the following structural formula:

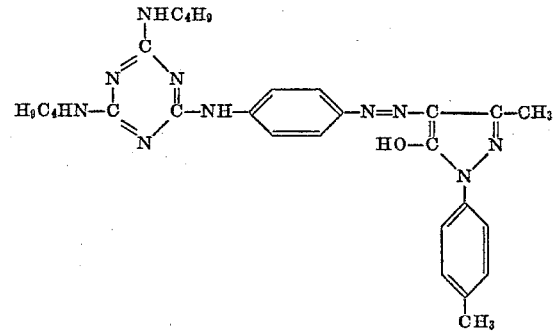

Many additional dyestuffs within the scope of the present invention may be produced including, for example, those having the following structural formulas:

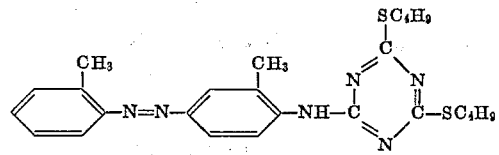

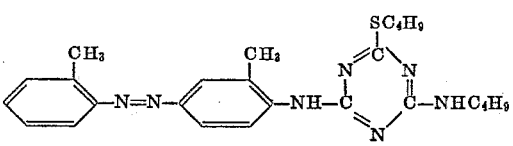

and

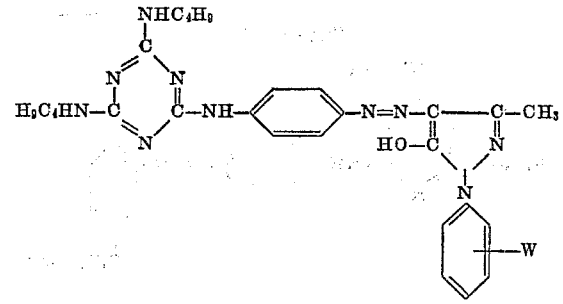

Variations can, of course, be made without departing from the spirit and scope of the present invention.

Having thus described our invention, what we desire to secure by Letters Patent and hereby claim is:

1. A plastosoluble dyestuff having the formula:

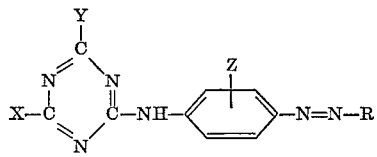

wherein X and Y are each selected from the group consisting of alkylamino, dialkylamino and alkylmercapto radicals having from 3 to 18 carbon atoms; Z is hydrogen or a methyl radical; and R is a radical selected from the group consisting of

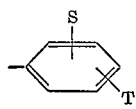

wherein S is hydrogen or hydroxyl and T is hydrogen, lower alkyl or cyclohexyl;

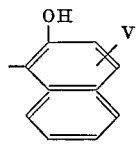

wherein V is hydrogen or

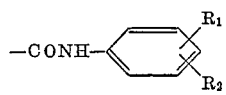

wherein $R_1$ is —$OCH_3$ or —Cl and $R_2$ is —$OCH_3$ or hydrogen; and

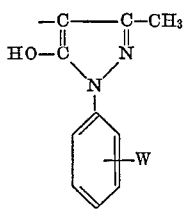

wherein W is hydrogen, —Cl or a lower alkyl radical having from 1 to 6 carbon atoms.

2. The dyestuff of claim 1 wherein both X and Y are —$NHC_4H_9$.
3. The dyestuff of claim 1 wherein both X and Y are —$SC_4H_9$.
4. The dyestuff of claim 1 wherein both X and Y are —$NHC_3H_7$-iso.
5. The dyestuff of claim 1 wherein X is —$NHC_4H_9$ and Y is —$SC_4H_9$.
6. The dyestuff of claim 1 having the formula:

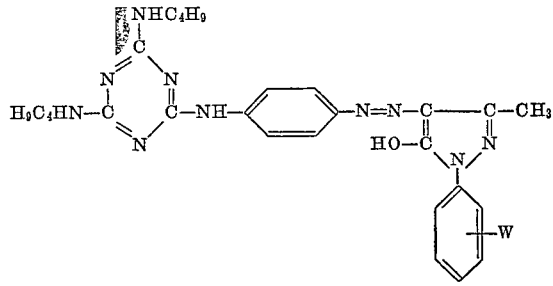

wherein W is hydrogen, chlorine or an alkyl radical having from 1 to 6 carbon atoms.

7. The dyestuff having the formula:

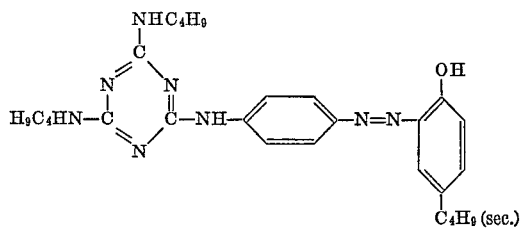

8. The dyestuff having the formula:

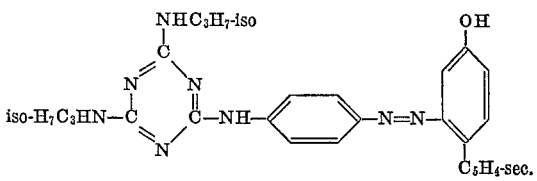

9. The dyestuff having the formula:

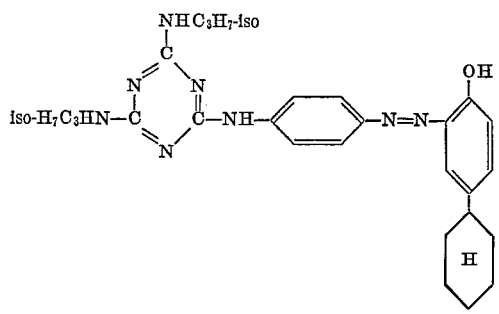

10. The dyestuff having the formula:

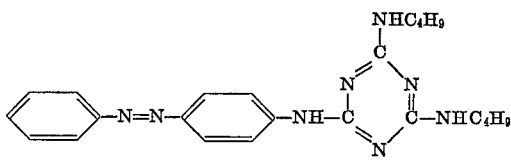

References Cited

UNITED STATES PATENTS

| | | | |
|---|---|---|---|
| 2,643,996 | 6/1953 | Widmer et al. | 260—153 |
| 2,953,560 | 9/1960 | Baker et al. | 260—153 |
| 3,108,846 | 10/1963 | Utsunomiya et al. | 260—153 XR |
| 3,177,214 | 4/1965 | Sulzer et al. | 260—249 |
| 3,320,232 | 5/1967 | Wegmuller et al. | 260—153 |

FOREIGN PATENTS

| | | |
|---|---|---|
| 840,742 | 7/1960 | Great Britain. |
| 344,152 | 3/1960 | Switzerland. |

CHARLES B. PARKER, Primary Examiner

DONALD M. PAPUGA, Assistant Examiner

U.S. Cl. X.R.

8—41, 55; 260—163, 197, 205, 249

PO-1050
(5/69)

UNITED STATES PATENT OFFICE
CERTIFICATE OF CORRECTION

Patent No. 3,459,729          Dated August 5, 1969

Inventor(s) ARGENTO CROTTI AND FABRIZIO MERLO

It is certified that error appears in the above-identified patent and that said Letters Patent are hereby corrected as shown below:

Column 3, line 74, "atoms, phenol" should read -- atoms, and is preferably phenol --. Column 4, line 17, "emyloyed" should read -- employed --. Column 5, line 52, the structural formula "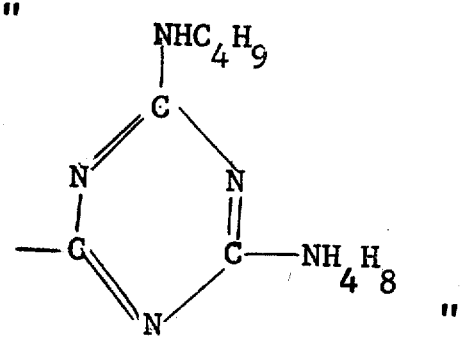"     should read     "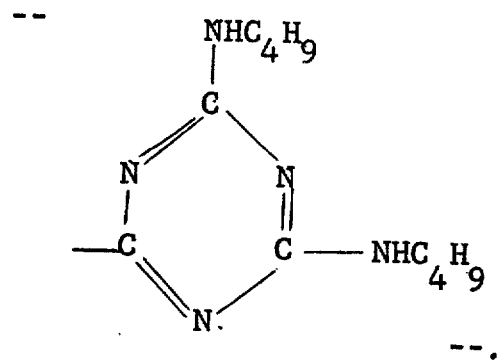" --.

Column 6, line 37, "NaCO$_3$" should read -- Na$_2$CO$_3$ --. Column 7, line 35, the structural formula "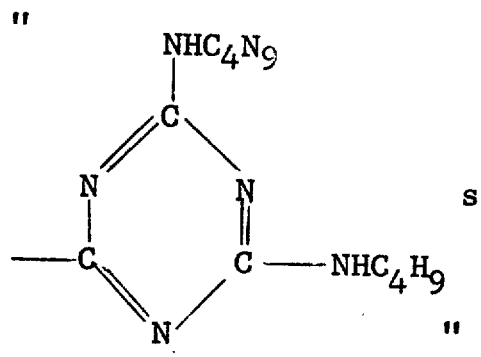"     should read     "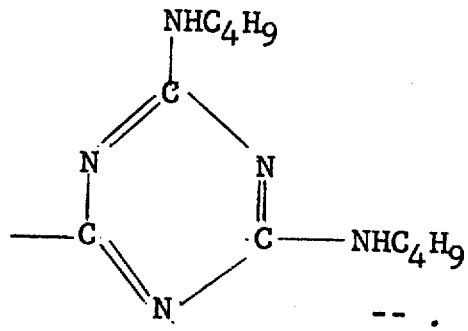" --.

SIGNED AND SEALED
APR 28 1970

(SEAL)
Attest:

Edward M. Fletcher, Jr.
Attesting Officer

WILLIAM E. SCHUYLER, JR.
Commissioner of Patents